United States Patent [19]

Helfrich

[11] Patent Number: 5,615,092
[45] Date of Patent: Mar. 25, 1997

[54] SWITCHING POWER SUPPLY REGULATOR WITH AN INDUCTIVE PULSE CIRCUIT

[75] Inventor: Kenneth J. Helfrich, Fishers, Ind.

[73] Assignee: Thomson Consumer Electronics, Inc., Indianapolis, Ind.

[21] Appl. No.: 535,802

[22] Filed: Sep. 28, 1995

[51] Int. Cl.$^6$ ............................ H02M 3/335; H01J 29/70
[52] U.S. Cl. ............................................. 363/21; 315/411
[58] Field of Search ................................. 363/20, 21, 41, 363/97, 124; 358/190; 315/411

[56] References Cited

U.S. PATENT DOCUMENTS

| | | | |
|---|---|---|---|
| 4,930,060 | 5/1990 | Leonardi | 363/21 |
| 4,937,727 | 6/1990 | Leonardi | 363/97 |
| 4,941,078 | 7/1990 | Leonardi | 363/97 |
| 4,994,719 | 2/1994 | Lendaro | 315/411 |
| 5,093,605 | 3/1992 | Meinertz | 315/411 |
| 5,266,871 | 11/1993 | Haferl | 315/411 |
| 5,276,604 | 1/1994 | Messman | 363/65 |
| 5,453,921 | 9/1995 | Shutts | 363/21 |

*Primary Examiner*—Peter S. Wong
*Assistant Examiner*—Bao Q. Vu
*Attorney, Agent, or Firm*—Joseph S. Tripoli; Joseph J. Laks; Harvey D. Fried

[57] ABSTRACT

A horizontal deflection circuit couples flyback pulses from a first transformer winding to a second transformer winding. The second winding is coupled to a source of unregulated DC voltage. A switch has input, output and control terminals. The output terminal is coupled to the first winding. The switch operates with a variable duty cycle for generating a regulated DC voltage at the output terminal. An inductor and a diode are coupled to the second winding. The inductor is also coupled to the input terminal. A pulse width modulator varies the duty cycle of the switch responsive to feedback and timing signals. Drive voltage for the control terminal is supplied by a first capacitor charged during retrace intervals and a second capacitor charged at the end of the retrace intervals by the first capacitor. The second capacitor is coupled to the control terminal and the drive voltage is discharged by the pulse width modulator.

15 Claims, 2 Drawing Sheets

SWITCHING POWER SUPPLY REGULATOR WITH AN INDUCTIVE PULSE CIRCUIT

BACKGROUND OF THE INVENTION

The invention relates to a switched mode power supply, especially for television receivers, the supply having an inductor and clamping diode in combination with a switching transistor whose duty cycle is varied at the horizontal scanning rate, to regulate an output voltage level of a power supply.

Switching regulators use the on and off time of a switching transistor to regulate the current supplied to a load circuit. By varying the switching time instead of varying the conducting current level, the switching regulator avoids the high power dissipation of series regulators. In television apparatus, a switching regulator can be used in conjunction with the flyback transformer that generates horizontal beam deflection signals. The switching regulator is operated synchronously with horizontal scanning, but the on-time or duty cycle of the switching regulator is varied as needed to couple sufficient power to secondary windings of the flyback transformer for regulating various supply voltages to maintain reference levels. This includes the regulated B+ supply voltage, which supplies current to a winding of the flyback transformer coupled to the horizontal output transistor for effecting horizontal beam scanning.

A switching regulator as described can be driven by a pulse width modulator in a feedback arrangement. A current supply charges a capacitor repetitively at the horizontal rate to provide a sawtooth voltage that is applied to one input of a comparator. An error voltage representative of the regulated output voltage is applied to another input of the comparator. The comparator controls the switching transistor of the voltage regulator, namely turning off the switching transistor at the time during each period when the sawtooth voltage exceeds the regulated output voltage. The duty cycle of the switching transistor is made relatively higher to couple more power through the switching transistor when needed, and vice-versa, to maintain the output voltage at a reference level.

In one type of switching regulator, known as a "buck" regulator, the switching transistor and an inductor are coupled in series between the unregulated supply voltage and an output, typically with a parallel storage capacitor. An electromagnetic field is built up in the inductor when the transistor is conducting. When the switching transistor turns off, back electromotive force induces a voltage across the inductor. A clamping diode or "catch" diode is coupled to hold the junction of the switching transistor and the inductor at voltage just below ground. The back electromotive force then is applied to maintain the positive voltage on the output, with the inductor supplying current to maintain the output voltage when the switching transistor is off. This arrangement relies on the switching transistor to turn off current to the inductor, to generate an inductive power impulse, also referred to as an inductive buck.

One of the difficulties encountered in the design of a buck type regulator is the need to drive the gate of the switching transistor. Where the switching transistor is a MOSFET, for example, the gate voltage must be referenced to the MOSFET source terminal. However, the voltage at the source terminal is not constant, instead varying with the input voltage level relative to ground depending on the conduction of the MOSFET.

In the conventional buck regulator, the inductor and catch diode are coupled to the source (or emitter) of the switching transistor. That is, the transistor is upstream of the inductor along the current supply path, between the unregulated supply voltage and the junction of the inductor and catch diode. When the transistor switches off, the source terminal of the transistor and the cathode of the catch diode attempt to go negative as the back electromotive force that arises on the inductor, is subtracted from the regulated output voltage at the opposite terminal of the inductor. Conduction of the catch diode then clamps the voltage at the upstream terminal of the inductor. The inductive impulse can then be applied to the output.

SUMMARY OF THE INVENTION

In an inventive arrangement, an inductive power impulse, or inductive buck, is obtained using an inductor that is upstream of a switching transistor, with a catch diode coupled to the terminal of the inductor on the unregulated supply voltage side. In this arrangement, the switching transistor needs to conduct when the catch diode is conducting, so that the inductive impulse is coupled through to the output. The power supply operates in a discontinuous mode. Means apart from the switching transistor are needed to initiate conduction of the catch diode for grounding the more negative terminal of the inductor, such that the inductive impulse can be coupled through the transistor to the load. A mechanism for turning off current supply to the inductor of the regulator is provided by summing the horizontal retrace pulse with the unregulated voltage (to which the voltage regulator is coupled for generating the regulated B+ voltage), using the windings of the flyback transformer. The retrace pulse, added to the unregulated supply voltage by coupling through the flyback transformer, causes the input voltage to fall. Conduction of the catch diode clamps the voltage just below ground, initiating the inductive impulse. The catch diode conducts only during the retrace interval and the switching transistor is turned off before the end of the retrace, when a new pulse width modulation period commences.

A power supply in accordance with the inventive arrangement comprises: a source of an unregulated DC voltage; a horizontal deflection circuit for inductively coupling flyback pulses from a first winding of a flyback transformer to a second winding of the flyback transformer, the second winding being coupled to the unregulated DC voltage; a switch having an input terminal, a control terminal and an output terminal, the output terminal being coupled to the first winding and the switch being operated with a variable duty cycle for generating a regulated DC voltage at the output terminal; an inductor and a diode having a common junction coupled to the second winding, the inductor also being coupled to the input terminal of the switch; and, means for varying the duty cycle of the switch responsive to a feedback signal indicative of variations of a load energized by the regulated DC voltage.

in a further inventive arrangement, a gate drive circuit for the switching transistor provides a gate drive voltage derived from summed trace and retrace portions of the horizontal scanning signal. The retrace pulse charges a first capacitor and the trace pulse of the same scanning signal dumps the charge into a second capacitor providing the gate drive for the switching transistor. A pulse width modulator with a current sinking switch operates synchronously with horizontal synchronizing pulses to repetitively turn off the switching transistor responsive to a load variable feedback signal.

A power supply in accordance with the further inventive arrangement comprises: a source of an unregulated DC voltage; a switch having an input terminal, a control terminal and an output terminal, the switch being operated with a variable duty cycle for generating a regulated DC voltage at the output terminal; a horizontal deflection circuit for inductively coupling flyback pulses from a first winding of a flyback transformer to a second winding of the flyback transformer, the output terminal being coupled to the first winding, and the second winding being coupled to the unregulated DC voltage and to the input terminal; a first capacitor charged by the unregulated DC voltage and the flyback pulses; a second capacitor charged by the first capacitor and supplying a drive voltage to the control terminal; and, means for varying the duty cycle of the switch responsive to a feedback signal indicative of variations of a load energized by the regulated DC voltage.

DETAILED DESCRIPTION OF THE PREFERRED EMBODIMENTS

Figure 1:
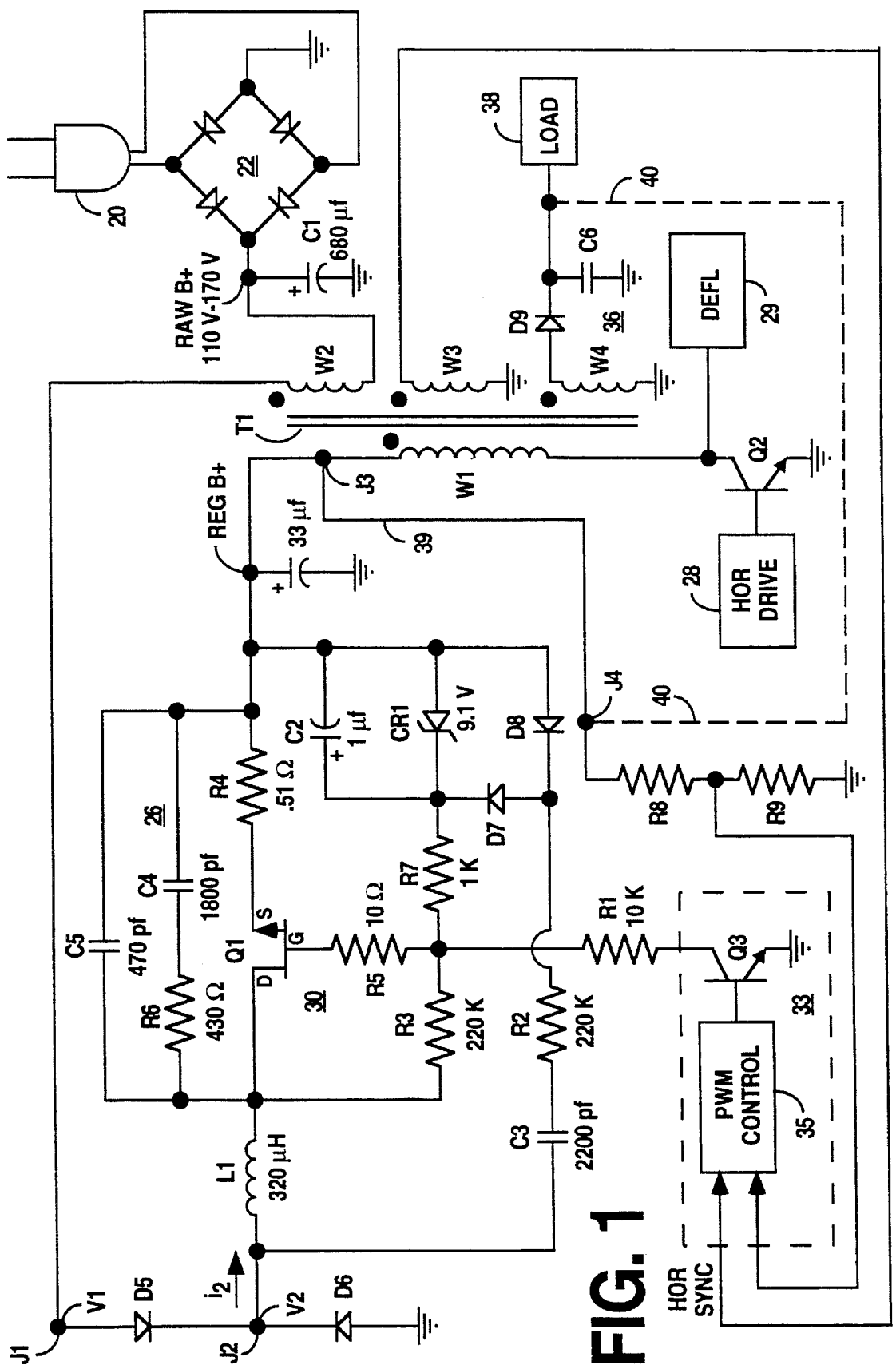
FIG. 1 is a circuit diagram, partially in block form, schematically of a switching power supply regulator according to the inventive arrangements.

In FIG. 1, AC power from the domestic mains 20 is rectified by a bridge rectifier 22 and coupled to charge a filter capacitor C1 to provide a DC drive voltage, namely the unregulated B+ voltage (RAW B+), for example 110 volts–170 volts, coupled to a winding W2 of a flyback transformer T1. A switching regulator 30 is coupled to the other terminal of winding W2 and via switching transistor Q1, provides a regulated B+ voltage (REG B+), for example 130 volts, coupled to another primary winding W1 of the flyback transformer. Horizontal output transistor Q2 is coupled to the other terminal of winding W1 and driven by the output signal of a horizontal drive circuit 28. In the run mode of the television, the operation of the horizontal output transistor Q2 applies flyback pulses to winding W1 and energizes a deflection circuit (DEFL) 29, which includes horizontal beam deflection coils, which are coupled to horizontal output transistor Q2 via a diode and parallel and series capacitors for providing a sawtooth current at the horizontal scanning frequency. Secondary windings of the flyback transformer provide various voltages as needed to drive run mode loads.

A feedback signal is compared to a reference by error amplifier 33, which comprises a pulse width modulator (PWM) control 35 and a transistor switch Q3. The operation of pulse width modulator 35 is synchronous with horizontal synchronizing pulses, and accordingly, may be controlled by flyback pulses, designated HOR SYNC, from a secondary winding W3 of the flyback transformer. Other signals which are synchronous with horizontal synchronizing signals, including horizontal synchronizing signals themselves, may be utilized.

The feedback signal may be generated directly from the regulated DC voltage, or indirectly from a load energized by the regulated DC voltage. In FIG. 1, a solid line 39 indicates a feedback path connection between a junction J3 and a junction J4, for directly monitoring the regulated DC voltage. Dashed line 40 indicates an alternative feedback path connection between a flyback derived secondary supply 36 and junction J4, which may be used instead of connection 39. Derived secondary supply 36 comprises a secondary flyback transformer winding W4, for supplying flyback pulses to rectifying diode D9 and capacitor C6, which energize a load 38.

In either case, the feedback voltage may be scaled by a voltage divider formed by resistors R8 and R9, the values of which will depend upon the range of the voltage being monitored. The output of error amplifier 33 is coupled by resistor R1 to the gate of transistor Q1, for adjusting the length of time that switching transistor Q1 remains in conduction during each horizontal period. When power consumption increases, transistor Q1 conducts incrementally longer, thereby coupling additional power through the flyback transformer to the loads. When power consumption decreases, transistor Q1 conducts for a shorter length of time in the period, thus regulating the supply voltages, including the regulated B+ voltage.

Winding W2 of the flyback transformer is coupled to the source terminal of transistor Q1 by series connected rectifier diode D5 and inductor L1. Inductor L1 is arranged to provide an inductive impulse. A clamping diode or catch diode D6 is coupled to one terminal of inductor L1, for clamping the voltage at that terminal against going more than one forward biased diode drop to the negative.

Normally in a buck regulator, an inductor is provided on the source or emitter side of the switching transistor, such that the inductor is energized when the transistor is conducting and provides an inductive impulse when the transistor is turned off, the inductor continuing to provide current to the output from the back electromotive force produced by the collapsing field in the charged inductor. However, according to an inventive aspect, inductor L1 is provided on the drain side of transistor Q1. The inductive impulse is provided by the flyback pulse, which is coupled from winding W1 to winding W2, to provide a low going pulse which causes catch diode D6 to conduct. This clamps the cathode of diode D6 at about –0.7 volts, and applies the voltage of inductor L1 to the source terminal of transistor Q1.

Figure 2:
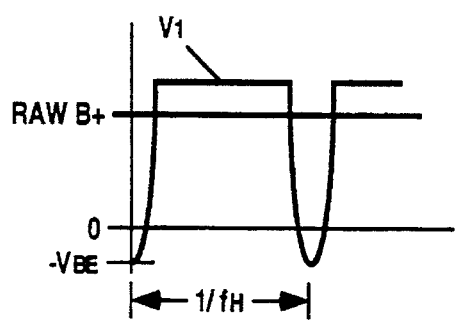
FIGS. 2 and 3 are waveforms useful for explaining the operation of the circuit shown in FIG. 1.

The unregulated B+ voltage on winding W2 of the flyback transformer is summed with the negative retrace pulse and coupled to diode D5, providing a voltage V1 that is greater than the unregulated B+ voltage because the trace portion of the horizontal signal applied to winding W1 and the unregulated B+ voltage are combined, that is, summed together. The RAW B+ voltage and voltage V1 at the junction J1 of winding W2 and the anode of diode D5 is shown in FIG. 2. The $1/f_H$ period of the pulses of voltage V1 result from the flyback pulses coupled from winding W1.

Figure 3:
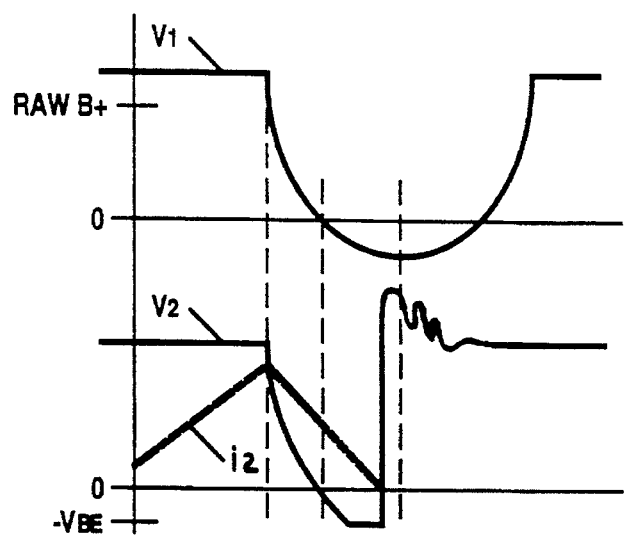

A voltage V2 at the junction J2 of the cathodes of diodes D5 and D6 may be thought of as a new B+ voltage. Voltage V2 is not filtered by a capacitor, so that voltage V2 will drop at the start of retrace, that is, at the negative flyback pulse, causing catch diode D6 to conduct: FIG. 3 shows voltage V2 and current i2 with respect to voltage V1, in an expanded time scale relative to FIG. 2.

The gate drive circuit comprises a storage capacitor C2 which is held at a predetermined maximum voltage, e.g., 9.1 volts, by Zener diode CR1. Resistor R3 provides gate charge when the television is turned off, but is still coupled to the power mains 20, so that transistor Q1, which is a MOSFET, remains conductive. When transistor Q1 is conducting in the regular scanning mode of the television, the output of error amplifier 33 is initially high and transistor Q1 conducts from charge provided on capacitor C2 through resistor R3. At the required time, the output of error amplifier 33 goes low and transistor Q1 is turned off, gate charge being removed through resistor R1. The circuit works to provide charge on capacitor C2, coupled to the gate of transistor Q1, by charging capacitor C3 when the catch diode D6 is conducting, and dumping the charge from capacitor C3 to capacitor C2 when the combination of the unregulated B+ voltage and the retrace pulse rises again after the retrace interval is finished.

When transistor Q1 is off, transistor Q3 removes the gate charge via resistors R1 and R7. Charge is provided to the gate of transistor Q1 when transistor Q3 is off. Capacitor C3 is charged through diode D8 and resistor R2 during the inductive impulse. The charge on capacitor C3 is then dumped through diode D7 to capacitor C2 when the unregulated B+ voltage rises after the retrace interval is finished. Zener diode CR1 regulates the voltage on capacitor C2, for example to 9.1 volts.

A snubber circuit 26 is coupled to transistor Q1. A resistor R6 and capacitor C4 are coupled in series with one another, between the drain terminal and a current overload resistor R4, in series with the source of transistor Q1. Capacitor C5 is coupled between the source and drain. A resistor R5 protects the gate of transistor Q1. A capacitor (not shown), for example having a capacitance of 220 pf, may be coupled across each of diodes D7 and D8 to suppress radio frequency interference.

The invention provides gate driving means for employing a novel buck converter arrangement in which the inductor L1 is upstream of the switch Q1, and a retrace pulse from a flyback winding W2 is operable to initiate conduction of a clamping or catch diode D6, to enable inductive impulses to be generated. The invention further provides a drive voltage on capacitor C2 for the control terminal of the switch Q1, for example the gate of a MOSFET, by the cooperative action of capacitor C3 being charged, and in turn, discharging to charge capacitor C2.

What is claimed is:

1. A power supply, comprising:
   a source of an unregulated DC voltage;
   a horizontal deflection circuit for inductively coupling pulses from a first winding of a transformer to a second winding of said transformer, said unregulated DC voltage being supplied to said second winding;
   a switch operated with a variable duty cycle and supplying a regulated DC voltage to said first winding;
   an inductor and a diode having a common junction coupled to said second winding, said inductor coupling said unregulated DC voltage to said switch; and,
   means for varying said duty cycle of said switch responsive to a feedback signal indicative of variations of a load energized by said a regulated DC voltage.

2. The power supply of claim 1, further comprising:
   a first capacitor charged by said unregulated DC voltage and said pulses; and,
   a second capacitor charged by said first capacitor and supplying a drive voltage to said switch, said drive voltage being discharged by operation of said means for varying said duty cycle.

3. The power supply of claim 2, wherein said second capacitor is coupled to said regulated DC voltage.

4. The power supply of claim 2, wherein said first capacitor is charged during retrace intervals and said second capacitor is charged at the end of said retrace intervals.

5. The power supply of claim 4, wherein said means for varying said duty cycle determines when said drive voltage is discharged.

6. The power supply of claim 5, wherein said means for varying said duty cycle comprises a pulse width modulator which operates synchronously with horizontal synchronizing pulses.

7. The power supply of claim 2, further comprising a Zener diode coupled to said regulated DC voltage and to said switch for regulating said drive voltage.

8. The power supply of claim 1, wherein said diode is coupled between said common junction and ground.

9. A power supply, comprising:
   a source of an unregulated DC voltage;
   a transformer having first and second windings, said second winding being coupled to said unregulated DC voltage;
   a switch operated with a variable duty cycle and coupled to said first and second windings;
   a horizontal deflection circuit for inductively coupling pulses from said first winding to said second winding, said switch supplying a regulated DC voltage to said first winding;
   a first capacitor charged by said unregulated DC voltage and said pulses;
   a second capacitor charged by said first capacitor and supplying a drive voltage to said switch; and,
   means for varying said duty cycle of said switch by repetitively discharging said drive voltage responsive to a feedback signal indicative of variations of a load energized by said regulated DC voltage.

10. The power supply of claim 9, further comprising an inductor and a diode having a common junction coupled to said second winding, said inductor also being coupled to said said switch.

11. The power supply of claim 10, wherein said diode is coupled between said common junction and ground.

12. The power supply of claim 9, wherein said first capacitor is charged during retrace intervals and said second capacitor is charged at the end of said retrace intervals.

13. The power supply of claim 12, wherein said second capacitor is coupled to said regulated DC voltage.

14. The power supply of claim 9, wherein said means for varying said duty cycle comprises a pulse width modulator which operates synchronously with horizontal synchronizing pulses.

15. The power supply of claim 9, further comprising a Zener diode coupled to said regulated DC voltage and to said switch for regulating said drive voltage.

* * * * *